United States Patent
Willis

(10) Patent No.: US 6,295,949 B1
(45) Date of Patent: Oct. 2, 2001

(54) LITTER BOX

(76) Inventor: Steven B. Willis, 12917 Cr. 3801, Athens, TX (US) 75751

( * ) Notice: Subject to any disclaimer, the term of this patent is extended or adjusted under 35 U.S.C. 154(b) by 0 days.

(21) Appl. No.: 09/562,776

(22) Filed: May 2, 2000

Related U.S. Application Data

(60) Provisional application No. 60/157,734, filed on Oct. 5, 1999.

(51) Int. Cl.[7] .................................................. A01K 29/00
(52) U.S. Cl. ............................................................ 119/165
(58) Field of Search ................................... 119/165, 166, 119/168

(56) References Cited

U.S. PATENT DOCUMENTS

| | | |
|---|---|---|
| 3,233,588 | 2/1966 | Thomas . |
| 4,325,822 | 4/1982 | Miller . |
| 4,522,150 | 6/1985 | Gershman . |
| 4,696,257 | 9/1987 | Neary et al. . |
| 4,886,014 | 12/1989 | Sheriff . |
| 5,168,834 * | 12/1992 | Buschur ............................. 119/166 |
| 5,178,099 | 1/1993 | Lapps et al. . |
| 5,402,751 | 4/1995 | De La Chevrotiere . |
| 5,507,252 | 4/1996 | Ebert . |
| 5,551,375 | 9/1996 | Flores . |
| 5,577,462 * | 11/1996 | Korth ................................... 119/166 |
| 5,601,052 | 2/1997 | Rood et al. . |
| 5,673,648 * | 10/1997 | Ayle .................................... 119/166 |
| 5,678,508 * | 10/1997 | Butzen ................................ 119/166 |
| 5,823,137 * | 10/1998 | Rood et al. ......................... 119/166 |
| 5,911,194 * | 6/1999 | Pierson, Jr. ......................... 119/166 |

\* cited by examiner

*Primary Examiner*—Charles T. Jordan
*Assistant Examiner*—Elizabeth Shaw
(74) *Attorney, Agent, or Firm*—John R. Emerson; Alvin R. Wirthlin; Akin, Gump, Strauss, Hauer & Feld, L.L.P.

(57) ABSTRACT

A litter box for separating pet waste from litter material includes a housing having a front panel connected to a rear panel through a pair of side panels extending therebetween, and top and bottom panels extending between the front, rear and side panels to form an interior space for retaining litter and pet waste. The front panel includes an access opening such that a pet can enter into and exit from the interior space. A collection screen is removably mounted in the housing. The collection screen has a bottom wall extending at least substantially between the side panels and the top and bottom panels. The bottom wall includes openings that are sized to permit passage of clean litter material therethrough while preventing passage of pet waste when the litter box is rotated from an upright position where the bottom wall is oriented substantially vertically to a tipped position where the bottom wall is oriented substantially horizontally.

22 Claims, 6 Drawing Sheets

LITTER BOX

CROSS-REFERENCE TO RELATED APPLICATION

This application claims the benefit of U.S. Provisional Application No. 60/157,734 filed on Oct. 5, 1999.

BACKGROUND OF THE INVENTION

1. Field of the Invention

This invention relates to small scale waste management systems, and more particularly to a litter box whose contents can be easily sifted and cleaned.

2. Description of the Related Art

Litter trays and boxes are common in households with pets, and more especially in households with cats, to collect pet waste. After repeated use, solid pet waste and coagulated litter clumps from pet urine foul the litter box and cause unpleasant odors, necessitating the frequent replacement, or sifting, of the litter by the pet owner. This task is not pleasant. Accordingly, a number of prior art products have addressed the need for a litter box that separates pet waste and clumps from clean litter.

There are, however, a number of disadvantages associated with existing litter boxes. Some require the user to flip the litter box 180°, while others require the user to flip the litter box 360°. Some require the user to use a complicated tilting, rotating motion to sift the litter, or to lift the sifting tray up through the litter to separate the pet waste, then rotate the box back approximately 90° to empty the main pan of litter so the sifting tray can be replaced. Finally, others mount the litter box on a frame, upon which the user rotates the box.

Accordingly, there exists a need for a litter box that is simple in design, easy to use, and inexpensive to construct.

SUMMARY OF THE INVENTION

According to the invention, a litter box is provided for separating pet waste from litter material. The litter box includes a housing having a front panel connected to a rear panel through a pair of side panels extending therebetween, and top and bottom panels extending between the front, rear and side panels to form an interior space for retaining litter and pet waste. The front panel includes an access opening such that a pet can enter into and exit from the interior space. A collection screen is removably mounted in the housing. The collection screen has a bottom wall that extends at least substantially between the side panels and the top and bottom panels, e.g. the edges of the bottom wall may be spaced from, or in contact with, the panels. In one preferred arrangement, the edge of the bottom wall close to the bottom panel may be spaced a sufficient distance from the bottom panel to allow for clearance of clean litter material when the collection screen is installed in the housing. The bottom wall includes openings that are sized to permit passage of clean litter material therethrough while preventing passage of pet waste when the litter box is rotated from an upright position where the bottom wall is oriented generally vertically to a tipped position where the bottom wall is oriented generally horizontally.

Further according to the invention, a litter box for separating pet waste from litter material comprises a housing having a front panel connected to a rear panel through a pair of side panels extending therebetween, and top and bottom panels extending between the front, rear and side panels to form an interior space for retaining litter and pet waste. The front panel includes an access opening such that a pet can enter into and exit from the interior space. A collection screen is removably mounted in the housing. The collection screen has a bottom wall extending at least substantially between the side panels and the top and bottom panels. The bottom wall includes openings that are sized to permit passage of clean litter material therethrough while preventing passage of pet waste when the litter box is rotated approximately 90° from an upright position where the bottom wall is oriented substantially vertically to a tipped position where the bottom wall is oriented substantially horizontally. The collection screen further includes side walls that extend along opposite sides of the bottom wall and an end plate connected to an upper end of the side walls and bottom wall to form a volume for holding the pet waste. An area of the bottom wall is preferably void of the openings. The bottom wall is spaced from the rear panel to provide a volume into which the clean litter material can be collected when the litter box is rotated from the upright position to the tipped position. The upper panel comprises the end plate of the connection screen and a removable lid. A panel portion extends between the bottom panel and the rear panel to facilitate rotation of the litter box between the upright and tipped positions. A lower pair of guide ribs are located on each side panel at least adjacent to the bottom panel and an upper pair of guide ribs are located on each side panel at least adjacent to the top panel. The upper pairs of guide ribs are in alignment with a respective one of the lower pairs of guide ribs. The side walls of the collection screen are slidably received between the upper and lower pairs of guide ribs.

Other objects and advantages of the invention will become apparent upon reading the following detailed description and appended claims, and upon reference to the accompanying drawings.

It is noted that the drawings are intended to depict only typical embodiments of the invention, and therefore should not be considered as limiting in scope. The invention will now be described in greater detail with reference to the accompanying drawings.

DETAILED DESCRIPTION OF THE PREFERRED EMBODIMENT

Figure 1:
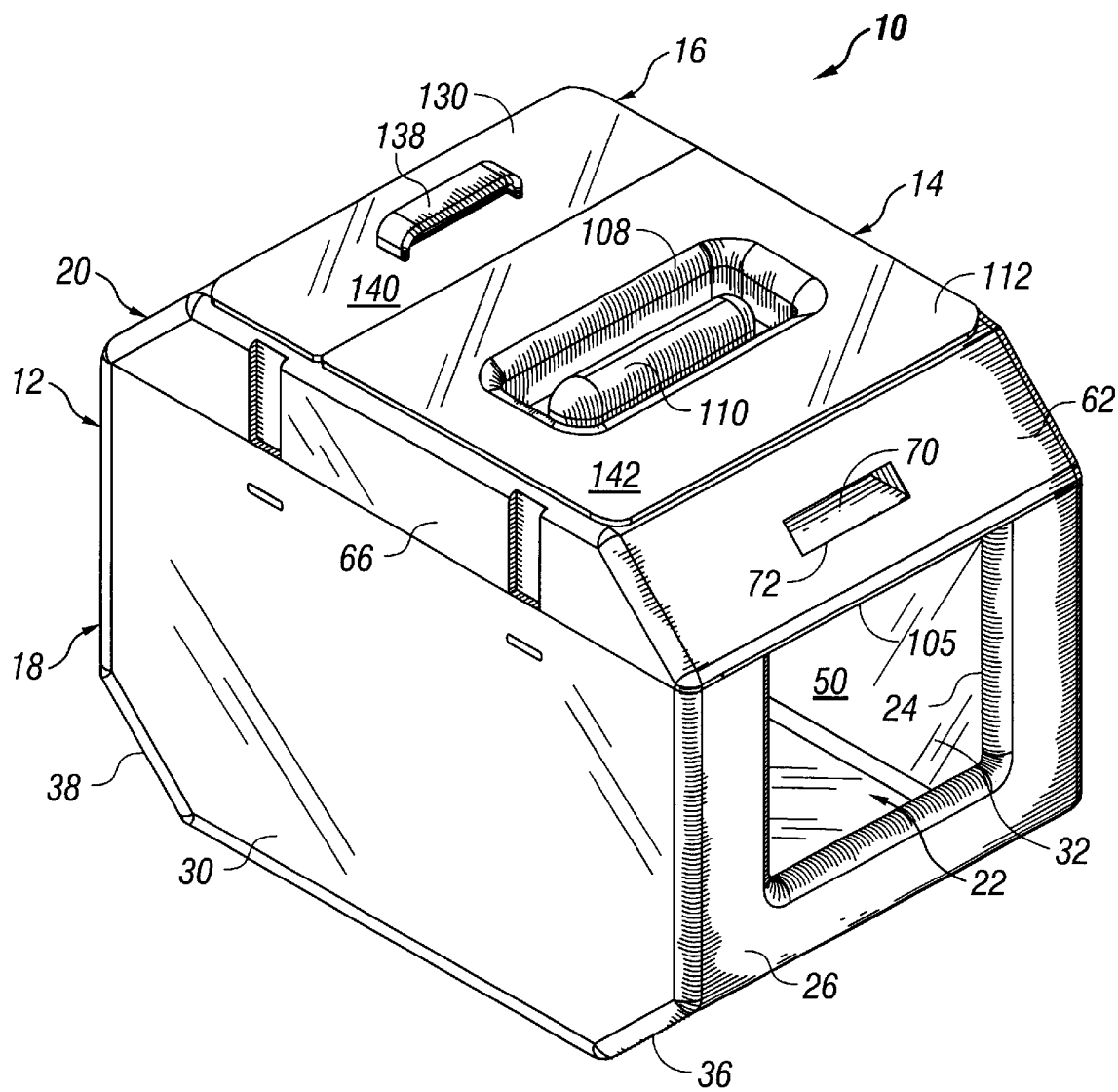
FIG. 1 is a front isometric view of a litter box according to the invention.
Figure 2:
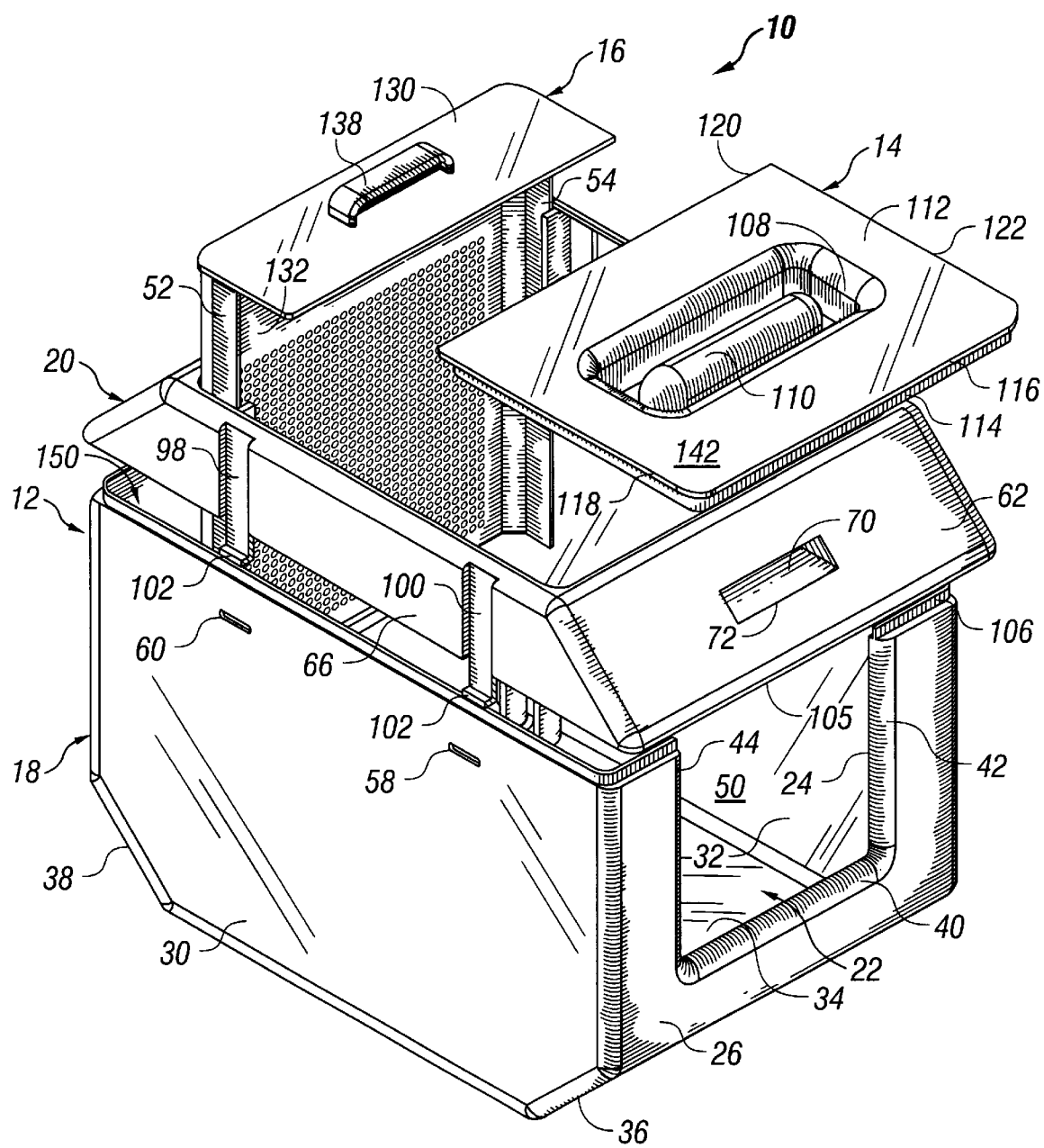
FIG. 2 is a front isometric exploded view of the litter box of FIG. 1.

Referring now to the drawings, and to FIGS. 1 and 2 in particular, a litter box 10 according to the invention includes a housing 12, an access lid 14 removably supported on the housing, and a collection screen 16 removable installed in the housing.

The housing 12 includes a lower housing portion 18 and an upper housing portion 20 connected to the lower housing portion, preferably through a snap-fit engagement, as will be described in greater detail below. The lower and upper housing portions together form an interior 22 with a pet access port 24 that opens into the interior 22.

Figure 3:
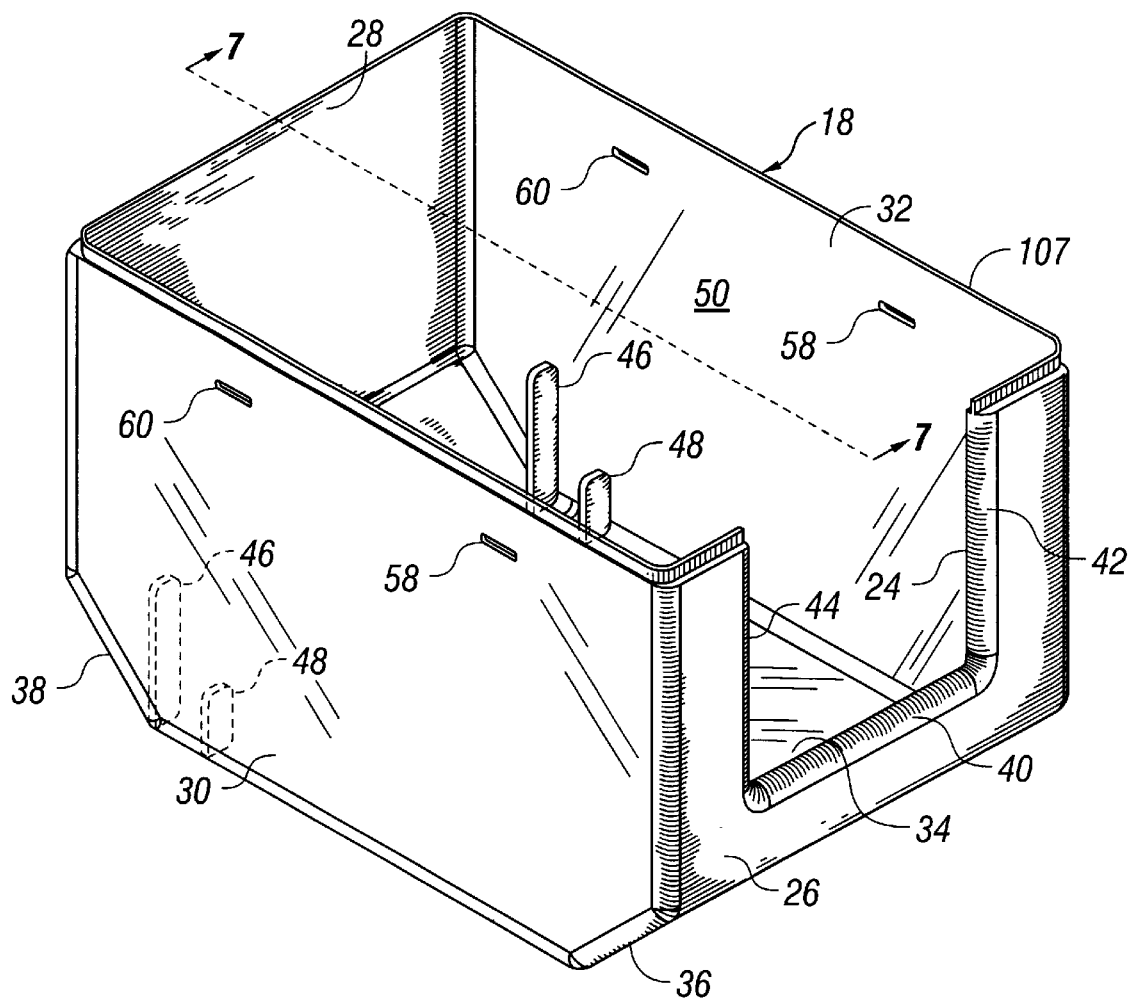
FIG. 3 is a front isometric view of a lower housing portion of the litter box.
Figure 7:
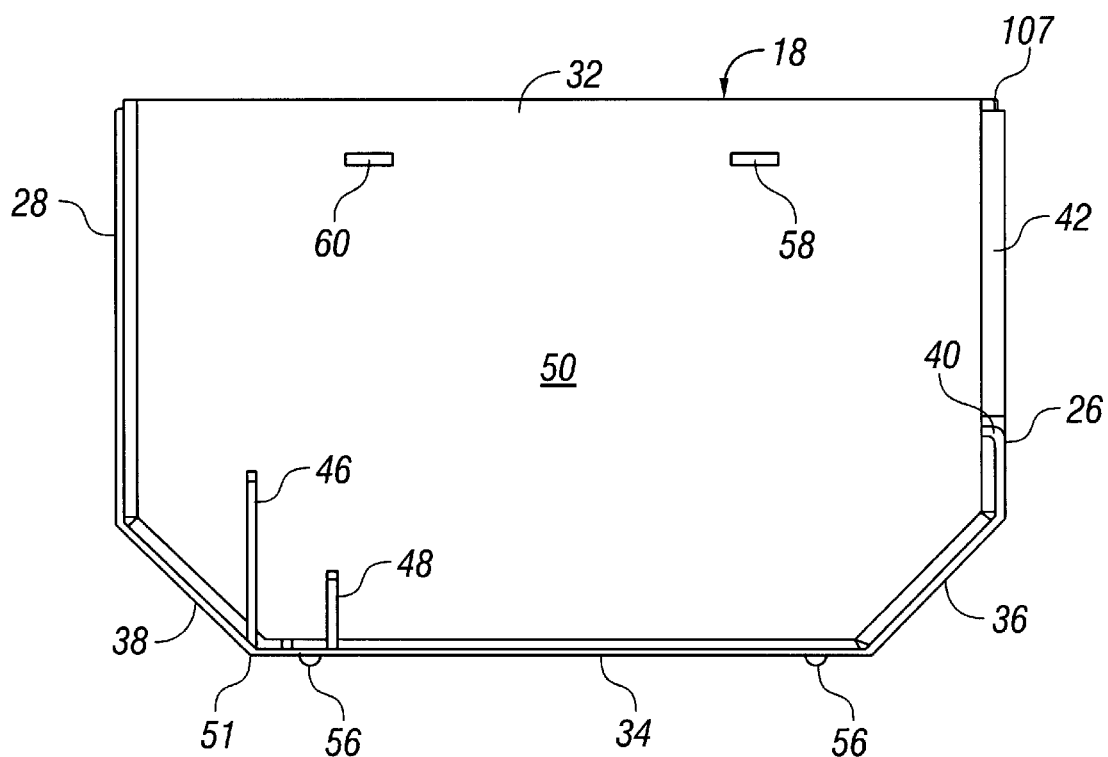
FIG. 7 is a cross sectional view of the lower housing portion taken along line 7—7 of FIG. 3.

With reference now to FIGS. 3 and 7, the lower housing portion 18 is preferably integrally formed of a plastic material and includes a front panel 26 connected to a rear panel 28 through a pair of side panels 30, 32. A bottom panel 34 extends between the side panels 30, 32 and is connected to the front panel 26 and the rear panel 28 by a front chamfered panel portion 36 and a rear chamfered panel portion 38, respectively. The front and rear chamfered portions facilitate rotation of the litter box 10, as will be described in greater detail below. The bottom panel together with the side, front and rear panels form a tray into which cat litter, bedding material, or the like may be contained. Preferably, the panels are curved or chamfered at their intersection. The access port 24 is formed in the front panel 26 and preferably includes a curved bottom edge 40 that extends between curved side edges 42, 44. The curved edges of the opening 24 assure the safe entry and exit of pets such as cats since there are no sharp edges to rub against. The bottom edge 40 also serves as a litter bar to help keep the litter or bedding material inside the box during use.

Guide ribs 46 and 48 are formed on the inner surface 50 of each of the side panels 30, 32 in opposing relationship and normally extend upwardly from the bottom panel 34. A lower end of each guide rib 46 is preferably located at the intersection 51 of the rear chamfered panel portion 38 and the bottom panel 34. The guide ribs 38 preferably extend substantially parallel to the guide ribs 36 and are spaced therefrom a sufficient distance to receive side walls 52, 54 (FIG. 2) of the collection screen 16. Although the guide ribs 36 and 38 are shown as extending substantially parallel to each other, it is to be understood that they may be nonparallel, especially when the side walls of the collection screen 16 are slanted. Feet 56 project downwardly from the bottom panel 34 to space the bottom panel from a floor or other support surface. Preferably, four feet are integrally molded with the bottom panel. Slots 58, 60 extend through each side wall 30, 32 for securing the upper housing portion 20 to the lower housing portion 18, as will be described in greater detail below.

Figure 4:
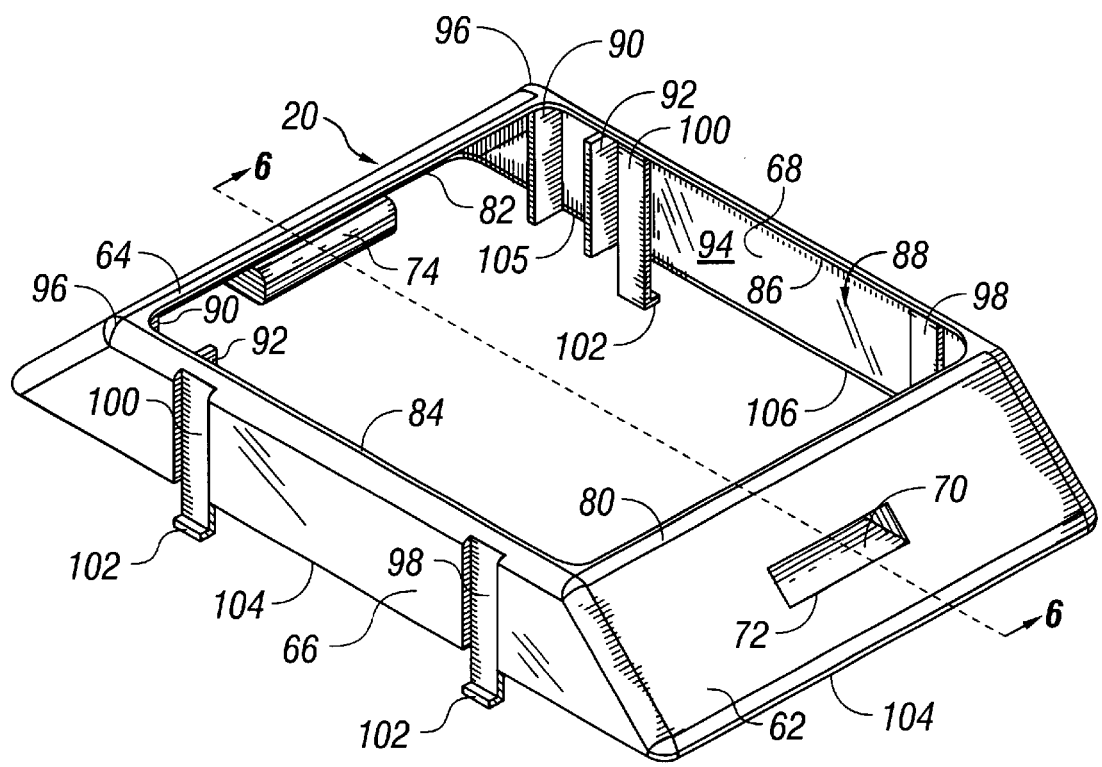
FIG. 4 is a front isometric view of an upper housing portion of the litter box.
Figure 6:
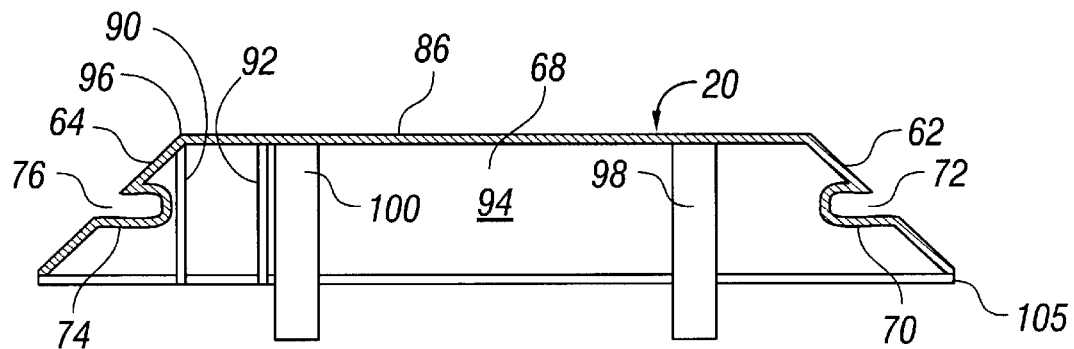
FIG. 6 is a cross sectional view of the upper housing portion taken along line 6—6 of FIG. 4.

With reference now to FIGS. 4 and 6, the upper housing portion 20 is preferably integrally formed of a plastic material and includes a front panel 62 connected to a rear panel 64 through a pair of side panels 66, 68. Preferably, the front panel 62 is substantially parallel to the rear chamfered panel portion 38 while the rear panel 64 is substantially parallel to the front chamfered panel portion 36 when the upper and lower housing portions are assembled together. Likewise, the side panels 66 and 68 are preferably coplanar with the side panels 30 and 32, respectively, of the lower housing portion 18. The upper edges 80, 82, 84 and 86 of the panels 62, 64, 66 and 68, respectively, together define an opening 88 that receives the access lid 14 and collection screen 16.

A front pocket 70 with a forward facing opening 72 is formed in the front panel 62, and a rear pocket 74 with a rearward facing opening 76 is formed in the rear panel 64. The pockets 70, 74 serve as handles that may be grasped by a person to facilitate holding, transporting, and rotating the litter box 10.

Guide ribs 90 and 92 are formed on the inner surface 94 of each of the side panels 66, 68 in opposing relationship and normally extend downwardly from the upper edges 84, 86. An upper end of each guide rib 90 is preferably located at the intersection 96 of the rear panel 64 and the respective side panel 66, 68. The guide ribs 90 and 92 are preferably collinear with the guide ribs 46 and 48, respectively, when the upper and lower housing portions are assembled together to receive the side walls 52, 54 (FIG. 2) of the collection screen 16. Although the guide ribs 90 and 92 are shown as extending substantially parallel to each other, it is to be understood that they may be nonparallel, especially when the side walls of the collection screen 16 are slanted.

Fingers 98, 100 are formed on each of the side panels 66 and 68 in opposing relationship. The fingers 98, 100 are preferably integrally formed as a depression in each of the side panels and extend below lower edges 104 and 106 of the side panels 66 and 68, respectively, in cantilever fashion. An outwardly projecting catch 102 is formed at the lower end of each finger 98, 100 and is sized to be received in one of the slots 58, 60 (FIG. 2) of the lower housing portion 18. Engagement of the catches 102 with their respective slots secures the lower and upper housing portions together during assembly. The cantilever nature of the fingers 98, 100, allows some flexing of the fingers during assembly and disassembly. The lower and upper housing portions may be disassembled by inserting a flat-head screw driver or other object into the slots 58, 60 to press against the catches 102 and release them from the slots.

In an alternative arrangement, the slots in the lower housing portion may be replaced with inner projections (not shown) to receive the catches of the upper housing portion. Other means of attachment may also be provided, such as mechanical fasteners, ultrasonic welding, adhesives, and so on. Alternatively, the upper and lower housing portions may be integrally formed as a unitary structure during manufacture.

A lower flange 105 extends around the lower periphery of the upper housing portion 20 and is received over an upper peripheral edge 107 of the lower housing portion 18 when assembled. A front portion of the lower flange 105 serves as an upper edge of the pet access port 24.

Figure 5:
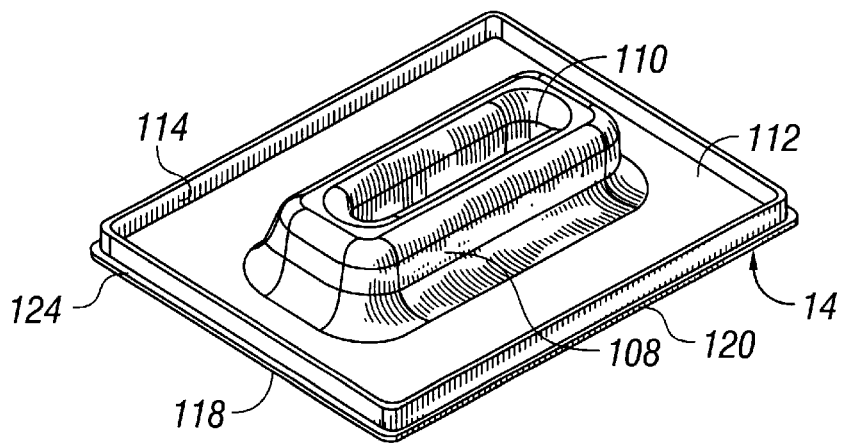
FIG. 5 is bottom isometric view of an access lid that forms part of the litter box of FIG. 1.

Referring now to FIGS. 1, 2 and 5, the access lid 14 includes a depression 108 that extends downwardly from a plate 112 and a hollow handle 110 that is formed in the depression 108 and extends upwardly toward the plate 112. A continuous lip 114 extends around the periphery of the plate 112 and is spaced from outer edges 116, 118, 120, and 122 of the plate to form a peripheral support flange 124. When assembled, the lip 114 is located adjacent the upper edges 80, 84 and 86 (FIG. 4) of the upper housing portion 20, and the peripheral support flange 124 is supported on the upper edges 80, 84 and 86.

Figure 8:
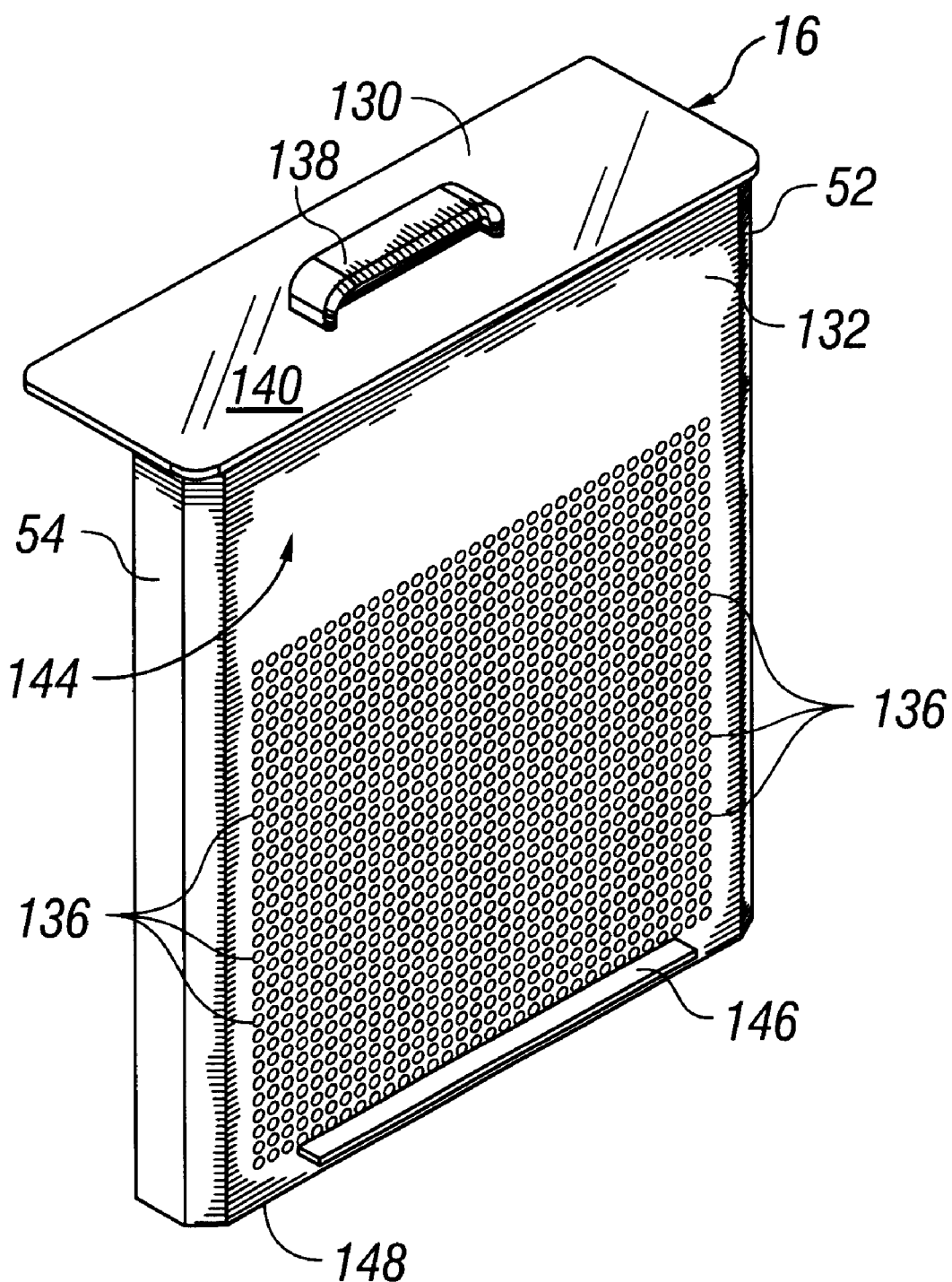
FIG. 8 is a rear isometric view of a collection screen that forms part of the litter box of FIG. 1.

With reference now to FIGS. 2 and 8, the collection screen 16 includes the side walls 52, 54 that extend from opposite ends of an end plate 130 and a bottom wall 132 that extends from the end plate 130 and between the side walls 52, 54. The collection screen 16 is preferably of unitary construction and molded from a suitable plastic material. However, the collection screen may be constructed of separate components and any suitable material. The side walls together with the end plate and bottom wall of the collection screen form a tray for receiving pet waste, litter clumps, and other objects, and help prevent such objects from falling off the collection screen when removed from the litter box. A plurality of openings or perforations 136 are formed in the bottom wall 132 to allow cat litter or bedding material to pass or sift therethrough during a cleaning operation, as will be described in greater detail below.

As shown, the side walls 52, 54 of the collection screen slide between the guide ribs 90, 92 on the side panels 66, 68 of the upper housing portion 20 and the guide ribs 46, 48 on the side panels 30, 32 of the lower housing portion 18. When the collection screen 16 is installed in the litter box 10, the end plate 130 is supported by the upper edges 82, 84 and 86 of the upper housing portion 20 and the guide ribs hold the collection screen 16 in place. A handle 138 extends outwardly from the end plate 130 to facilitate removal and installation of the collection screen 16. Preferably, an outer surface 140 of the end plate 130 is coplanar with an upper surface 142 of the plate 112.

Preferably, the bottom wall 132 of the collection screen 16 includes a solid portion 144 adjacent the end plate 130 to create a volume within which the litter waste may be collected and contained during transportation from the litter box to a waste receptacle. A longitudinal stop bar 146 is formed adjacent a lower edge 148 of the wall 132. As the user removes the tray from the litter box, the stop bar will engage the upper edge 82 of the upper housing portion 20 to help prevent abrupt falling movement and consequent spillage of the collection screen's contents as the lower edge 148 of the collection screen clears the upper edge 82, especially when the collection screen is oriented in the horizontal position, as will be described in greater detail below. The stop bar 146 requires the user to stop and lift the screen tray until the stop bar clears the upper edge 82 before the screen tray can be separated from the housing.

In use, the user cleans the litter box 10 by rotating it backwards approximately 90° from the upright position to a tipped position where the litter box is supported on the rear panel 28. The rear chamfered panel portion 38 facilitates rotation of the litter box between the upright and tipped positions. As the litter box rotates backwards, the litter moves toward the rear panel 28 and onto the collection screen 16. Uncoagulated litter falls through the screen into a retention chamber 150 located rearwardly of the collection screen and defined by the rear panel 28, the chamfered panel portions 38 and 64, and the side walls 30, 32 and 66, 68 of the lower and upper housing portions, respectively. Coagulated litter and other waste matter that cannot fall through the collection screen remains on top of the bottom wall 132 of the collection screen, with the collection screen in a generally horizontal position. The user then grasps the handle 138 and pulls the collection screen out of the litter box, being careful to lift the collection screen such that the stop bar clears the upper edge 82. The coagulated litter and other objects can then be disposed of in a suitable receptacle. The user then rotates the litter box to the original upright position from the tipped position, causing the screened litter to return to the bottom panel 34. The collection screen 16 can then be replaced. Additional clean litter may be added to the litter box through the removable access lid 14. Moreover, the user may easily clean the removable screen tray before reinsertion into the litter box.

It is to be understood that the terms upper, lower, side, front, rear, bottom, top, and their respective derivatives and equivalents as may be used herein refer to relative, rather than absolute positions and/or orientations.

While the invention has been taught with specific reference to these embodiments, those skilled in the art will recognize that changes can be made in form and detail without departing from the spirit and the scope of the invention. The described embodiments are to be considered in all respects only as illustrative and not restrictive. By way of example, the rear chamfered panel may be replaced with a more rounded portion, and may be located only between the bottom and rear panels, since the litter box is rotated only between these panels. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A litter box for separating pet waste from litter material, the litter box comprising:
   a housing having a front panel connected to a rear panel through a pair of side panels extending therebetween, and top and bottom panels extending between the front, rear and side panels to form an interior space for retaining litter and pet waste;
   said front panel including an access opening such that a pet can enter into and exit from said interior space;
   guide ribs mounted in opposing relationship on said side panels and extending into said interior space, said guide ribs being adapted to slidably receive said collection screen; and
   a collection screen removably mounted in said housing, said collection screen having a bottom wall extending at least substantially between said side panels and said top and bottom panels, said bottom wall including openings that are sized to permit passage of clean litter material therethrough while preventing passage of pet waste when said litter box is rotated from an upright position where said bottom wall is oriented generally vertically to a tipped position where said bottom wall is oriented generally horizontally.

2. A litter box according to claim 1, and further comprising a panel portion extending between said bottom panel and said rear panel to facilitate rotation of said litter box between the upright and tipped positions.

3. A litter box according to claim 2, wherein said bottom and rear panels are substantially perpendicular to each other, and further wherein said panel portion is substantially flat and extends at an acute angle from said bottom panel to said rear panel.

4. A litter box according to claim 2, wherein said panel portion is curved.

5. A litter box according to claim 1, wherein said upper panel comprises an end plate connected to an end of said bottom wall of said collection screen.

6. A litter box according to claim 5, wherein said upper panel further comprises a removable lid.

7. A litter box according to claim 1, wherein said guide ribs comprise at least one pair of guide ribs on each side panel.

8. A litter box according to claim 7, wherein said collection screen includes side walls extending along opposite sides of said bottom wall, each of said side walls being slidably received between a respective one of said pairs of guide ribs.

9. A litter box according to claim 1, wherein said guide ribs comprise a lower pair of guide ribs on each side panel at least adjacent to said bottom panel and an upper pair of guide ribs on each side panel at least adjacent to said top panel.

10. A litter box according to claim 9, wherein said upper pairs of guide ribs are in alignment with said lower pairs of guide ribs, respectively.

11. A litter box according to claim 9, wherein said collection screen includes side walls extending along opposite sides of said bottom wall, said side walls being slidably received between said upper and lower pairs of guide ribs.

12. A litter box according to claim 10, wherein said housing comprises a lower housing portion connected to an upper housing portion.

13. A litter box according to claim 12, wherein said lower housing portion includes said front, rear, side and bottom panels.

14. A litter box according to claim 12, wherein said upper pairs of ribs are formed on said upper housing portion and said lower pairs of ribs are formed on said lower housing portion.

15. A litter box according to claim 1, wherein said housing comprises a lower housing portion connected to an upper housing portion.

16. A litter box according to claim 15, wherein said lower housing portion includes said front, rear, side and bottom panels.

17. A litter box according to claim 15, wherein said upper and lower housing portions include mutually engageable connectors for securing said housing portions together.

18. A litter box according to claim 1, and further comprising a stop bar connected to a lower end of said bottom wall.

19. A litter box according to claim 1, wherein said bottom wall further comprises an area void of said openings.

20. A litter box according to claim 1, wherein said bottom wall is spaced from said rear panel to provide a volume into which said clean litter material can be collected when the litter box is rotated from the upright position to the tipped position.

21. A litter box according to claim 1, wherein an angle between said upright and tipped positions is approximately 90°.

22. A litter box for separating pet waste from litter material, the litter box comprising:

a housing having a front panel connected to a rear panel through a pair of side panels extending therebetween, and top and bottom panels extending between the front, rear and side panels to form an interior space for retaining litter and pet waste; said front panel including an access opening such that a pet can enter into and exit from said interior space;

a collection screen removably mounted in said housing, said collection screen having a bottom wall extending at least substantially between said side panels and said top and bottom panels, said bottom wall including openings that are sized to permit passage of clean litter material therethrough while preventing passage of pet waste when said litter box is rotated approximately 90° from an upright position where said bottom wall is oriented substantially vertically to a tipped position where said bottom wall is oriented substantially horizontally, said collection screen further including side walls extending along opposite sides of said bottom wall and an end plate connected to an upper end of the side walls and bottom wall to form a first volume for holding the pet waste, an area of said bottom wall being void of said openings, said bottom wall being spaced from said rear panel to form a second volume into which said clean litter material can be collected when the litter box is rotated from the upright position to the tipped position;

said upper panel comprising said end plate of said connection screen and a removable lid;

a panel portion extending between said bottom panel and said rear panel to facilitate rotation of said litter box between the upright and tipped positions; and a lower pair of guide ribs on each side panel at least adjacent to said bottom panel and an upper pair of guide ribs on each side panel at least adjacent to said top panel, the upper pairs of guide ribs being in alignment with a respective one of said lower pairs of guide ribs, with said side walls of said collection screen being slidably received between said upper and lower pairs of guide ribs.

\* \* \* \* \*